T. WHILDE.
REPAIR SHEET.
APPLICATION FILED OCT. 19, 1910.
991,256.
Patented May 2, 1911.
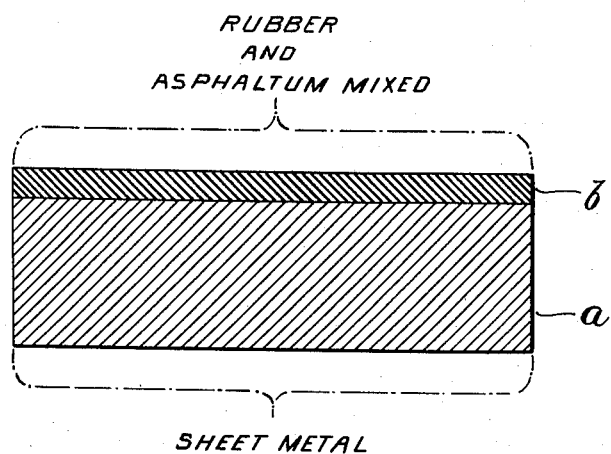

UNITED STATES PATENT OFFICE.

THOMAS WHILDE, OF BELLINGHAM, WASHINGTON.

REPAIR-SHEET.

991,256.

Specification of Letters Patent.

Patented May 2, 1911.

Application filed October 19, 1910. Serial No. 588,438.

*To all whom it may concern:*

Be it known that I, THOMAS WHILDE, a citizen of the United States, residing at Bellingham, in the county of Whatcom and State of Washington, have invented certain new and useful Improvements in Repair-Sheets, of which the following is a specification, reference being had to the accompanying drawing.

This invention relates to improvements in repair sheets for mending utensils used in cooking; and an object of this invention is to provide a repair sheet which will be comparatively cheap in manufacture, efficient in use and susceptible of being readily applied by an unskilled domestic.

In carrying out this invention, I use a thin sheet of readily fusible metal (such as sheet lead) and coat this sheet on both sides with a solution made by dissolving rubber and gum asphaltum in carbon disulfid. A small quantity of pitch may be added to the ingredients of the solution.

The figure in the accompanying drawing is a vertical section through my new repair sheet, the sheet-metal base being indicated by *a* and the superimposed mixture or coating by *b*.

In using my new repair patch, the hole or fracture in the utensil to be mended is thoroughly cleaned of rust and the like; and the deteriorated material around the hole may be cut away to insure that the wall of the hole shall be strong enough to support the patch. A narrow strip is then cut from the latter and is rolled up into the form of a plug just large enough to fill the hole well, with the ends of the plug projecting a little. The utensil with the hole thus plugged is held over a lamp or other suitable source of heat, until the plug is so hot that it will give forth a hissing sound when water is applied to it in minute quantities, as with the wet finger. The utensil is now placed upon a suitable support, as a table, and pressure is applied to the inside end of the plug, as by means of a damp thimble on the end of the finger. A smooth finish may be given so that the patch will not interfere with the use of spoons, knives and the like. Under the influence of the heat applied in repairing the utensil, the substances forming the coating combine to form a sort of cement; and the plug, when cooled, is practically a solid rivet firmly adherent to the material of the utensil, a result which depends for its accomplishment upon the coating of the sheet metal on both sides as hereinbefore described. My new repair patch has the advantage over solid plugs that the sheet may be rolled to a size which will quite exactly fit the hole to be repaired, while solid plugs are made in only certain sizes. Moreover, a skilled mechanic is needed to insert a solid plug neatly and securely in place and proper tools, such as a hammer or the like, are needed also. On the other hand, only light pressure, applied by the thimble-protected finger of an unskilled servant is needed to mend a utensil with my new repair patch.

The coating on the metal sheet is in no sense a flux and there is no flux used in connection with my new patch. Indeed, the part about the hole to be mended must be thoroughly cleaned and anything that might act as a flux is removed entirely. My new patch can be used for mending articles on which solder cannot be used, such as crockery, iron pots and articles made of aluminum, granite ware etc.

I claim:

1. A repair sheet of the class described consisting of a metal base coated with asphaltum and rubber.

2. A repair sheet of the class described consisting of a lead base coated with asphaltum and rubber.

3. A repair sheet of the class described consisting of a metal base coated with asphaltum, rubber and pitch.

4. A repair sheet of the character described consisting of a lead base coated with asphaltum, rubber and pitch.

5. A repair sheet of the character described consisting of a base of sheet-like metal coated with asphaltum and rubber.

6. A repair sheet of the character described consisting of a base of sheet-like metal coated with asphaltum, rubber and pitch.

In testimony whereof I hereunto set my hand at Bellingham, Washington, this 12th day of October, 1910, in the presence of the two undersigned witnesses.

THOMAS WHILDE.

Witnesses:
J. N. PHILLIPS,
GEORGE W. RICHARDSON.